(12) United States Patent
Bleszynski et al.

(10) Patent No.: US 6,603,768 B1
(45) Date of Patent: Aug. 5, 2003

(54) MULTI-PROTOCOL CONVERSION ASSISTANCE METHOD AND SYSTEM FOR A NETWORK ACCELERATOR

(75) Inventors: Ryszard Bleszynski, Cupertino, CA (US); Simon Chong, Fremont, CA (US); David A. Stelliga, Pleasanton, CA (US); Anguo Tony Huang, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/344,672

(22) Filed: Jun. 25, 1999

Related U.S. Application Data (60) Provisional application No. 60/090,939, filed on Jun. 27, 1998.

(51) Int. Cl.[7] .............................................. H04L 12/28
(52) U.S. Cl. ...................... 370/397; 370/399; 370/409
(58) Field of Search ................................. 370/466, 474, 370/409, 392, 399, 382, 395.1, 397, 394, 60

(56) References Cited

U.S. PATENT DOCUMENTS

| | | |
|---|---|---|
| 4,024,507 A | 5/1977 | Berkling et al. |
| 4,586,134 A | 4/1986 | Norstedt |
| 4,700,294 A | 10/1987 | Haynes |
| 5,218,687 A | 6/1993 | Ducousso et al. |
| 5,287,537 A | 2/1994 | Newmark et al. |
| 5,295,135 A | 3/1994 | Kammerl |
| 5,379,297 A | 1/1995 | Glover et al. |
| 5,394,402 A | 2/1995 | Ross |
| 5,414,707 A | 5/1995 | Johnston et al. |
| 5,481,536 A | 1/1996 | Reisch et al. |
| 5,515,370 A | 5/1996 | Rau |
| 5,517,488 A | 5/1996 | Miyazaki et al. |
| 5,535,201 A | 7/1996 | Zheng |
| 5,539,729 A | 7/1996 | Bodnar |
| 5,555,256 A | 9/1996 | Calamvokis |
| 5,555,265 A * | 9/1996 | Kakuma et al. ........ 370/395.43 |
| 5,564,051 A | 10/1996 | Halliwell et al. |
| 5,574,875 A | 11/1996 | Stansfield et al. |
| 5,590,128 A | 12/1996 | Maloney et al. |
| 5,619,650 A | 4/1997 | Bach et al. |
| 5,638,371 A | 6/1997 | Raychaudhuri et al. |
| 5,640,399 A | 6/1997 | Rostoker et al. ............. 370/392 |
| 5,652,872 A | 7/1997 | Richter et al. |
| 5,659,794 A | 8/1997 | Caldarale et al. |
| 5,664,116 A | 9/1997 | Gaytan et al. ......... 395/200.64 |
| 5,684,797 A | 11/1997 | Aznar et al. |
| 5,684,954 A | 11/1997 | Kaiserswerth et al. |
| 5,696,930 A | 12/1997 | Garetz et al. |
| 5,701,300 A | 12/1997 | Jeon et al. |
| 5,726,985 A | 3/1998 | Daniel et al. ................ 370/382 |
| 5,740,171 A | 4/1998 | Mazzola et al. |
| 5,742,772 A | 4/1998 | Sreenan |

(List continued on next page.)

*Primary Examiner*—Chau Nguyen
*Assistant Examiner*—Scott Waite
(74) *Attorney, Agent, or Firm*—Blakely, Sokoloff, Taylor & Zafman LLP (57) ABSTRACT

Systems and methods for assisting multiple protocol conversion in a network accelerator. A network device includes a transmit processing engine, a receive processing engine and one or more memories, each memory including one or more buffers for storing packets. When a packet is received, the receive engine adds a 4, 8, 12 or 16-byte tag to the front of the packet on a per-VC basis and stores the packet to a buffer. Additionally, the receive engine is able to add an offset to the starting address of the packet in the buffer relative to the beginning of the buffer. When a packet is to be transmitted, the transmit engine is able to transmit the packet from an address that is offset from the starting address of the buffer by one or more bytes. Additionally, the transmit engine is able to add one of several predefined packet headers on a per-packet basis.

28 Claims, 4 Drawing Sheets

| OFFSET | GENERIC HEADER SIZE | FIELDS |
|---|---|---|
| 0 | 40 | RxVCTag(16), LECID(2), MAC(22) |
| 16 | 24 | LECID(2), MAC(22) |
| 18 | 22 | MAC(22) |
| 32 | 8 | LLC/SNAP(8) PORTION OF THE MAC HEADER |
| 40 | 0 | NONE |

U.S. PATENT DOCUMENTS

| | | | |
|---|---|---|---|
| 5,745,477 A | 4/1998 | Zheng et al. | |
| 5,745,790 A | 4/1998 | Oskouy | |
| 5,748,630 A | 5/1998 | Bergantino et al. | |
| 5,751,951 A | 5/1998 | Osborne et al. | |
| 5,751,955 A | 5/1998 | Sonnier et al. | 395/200 |
| 5,754,530 A | 5/1998 | Awdeh et al. | |
| 5,764,895 A | 6/1998 | Chung | |
| 5,771,231 A * | 6/1998 | Watanabe | 370/377 |
| 5,796,715 A | 8/1998 | Patterson et al. | 370/60 |
| 5,796,978 A | 8/1998 | Yoshioka et al. | |
| 5,805,805 A | 9/1998 | Civanlar et al. | |
| 5,812,550 A | 9/1998 | Sohn et al. | |
| 5,825,765 A | 10/1998 | Menzilcioglu et al. | 370/394 |
| 5,835,928 A | 11/1998 | Auslander et al. | |
| 5,841,772 A | 11/1998 | Daniel et al. | |
| 5,848,068 A | 12/1998 | Daniel et al. | |
| 5,857,075 A | 1/1999 | Chung | |
| 5,867,712 A | 2/1999 | Shaw et al. | |
| 5,870,561 A | 2/1999 | Jarvis et al. | |
| 5,875,173 A | 2/1999 | Ohgane et al. | 370/230 |
| 5,878,232 A | 3/1999 | Marimuthu | |
| 5,905,874 A | 5/1999 | Johnson | |
| 5,909,441 A | 6/1999 | Alexander, Jr. et al. | |
| 5,910,955 A | 6/1999 | Nishimura et al. | |
| 5,912,892 A | 6/1999 | Barnhart et al. | |
| 5,935,249 A | 8/1999 | Stern et al. | |
| 5,943,693 A | 8/1999 | Barth | |
| 5,956,336 A | 9/1999 | Loschke et al. | |
| 5,974,457 A | 10/1999 | Waclawsky et al. | |
| 5,974,462 A | 10/1999 | Aman et al. | |
| 5,978,951 A | 11/1999 | Lawler et al. | |
| 5,983,332 A | 11/1999 | Watkins | |
| 5,991,854 A | 11/1999 | Watkins | |
| 6,003,027 A | 12/1999 | Prager | |
| 6,005,943 A | 12/1999 | Cohen et al. | |
| 6,041,059 A | 3/2000 | Joffe et al. | |
| 6,052,383 A | 4/2000 | Stoner et al. | |
| 6,058,434 A | 5/2000 | Wilt et al. | |
| 6,073,175 A | 6/2000 | Tavs et al. | |
| 6,085,252 A | 7/2000 | Zhu et al. | |
| 6,104,700 A | 8/2000 | Haddock et al. | |
| 6,119,170 A | 9/2000 | Schoffelman et al. | |
| 6,144,996 A | 11/2000 | Starnes et al. | |
| 6,154,776 A | 11/2000 | Martin | |
| 6,163,541 A | 12/2000 | Casey et al. | |
| 6,167,049 A | 12/2000 | Pei et al. | |
| 6,172,991 B1 | 1/2001 | Mori | |
| 6,198,751 B1 | 3/2001 | Dorsey et al. | |
| 6,201,971 B1 | 3/2001 | Purnadi et al. | |
| 6,223,292 B1 | 4/2001 | Dean et al. | |
| 6,269,396 B1 | 7/2001 | Shah et al. | |
| 6,285,674 B1 | 9/2001 | Soni et al. | |
| 6,285,684 B1 * | 9/2001 | Suzuki et al. | 370/471 |
| 6,311,212 B1 | 10/2001 | Chong et al. | |
| 6,311,238 B1 | 10/2001 | Hebert | |
| 6,337,863 B1 | 1/2002 | Nair et al. | |
| 6,411,625 B1 | 6/2002 | Furuhashi et al. | |
| 6,425,067 B1 | 7/2002 | Chong et al. | |

* cited by examiner

ETHERNET V2 AND IEEE 802.3 ENCAPSULATIONS

ETHERNET V2

| Dst Addr(6) | Src Addr(6) | EType(2) | IP(46-1500) | FCS(4) |
|---|---|---|---|---|

V2 MAC Header(14)

IEEE 802.3

| Dst Addr(6) | Src Addr(6) | Length(2) | LLC/SNAP(8) | IP(46-1500) | FCS(4) |
|---|---|---|---|---|---|

802.3 MAC Header(22)

SUPPORTED ENCAPSULATIONS

Mode 0 = Generic ATM

| Generic(0-63) | IP(46-1500) | AAL5(8-55) |
|---|---|---|

| MAC(14/22) |
|---|

| None(0) |
|---|

| Label(N*4) |
|---|

DIRECT ETHERNET
RFC1483 VC MUXED IP
MPLS LABELED PACKET

Mode 1 = LLC/SNAP

| LLC/SNAP(8) | Generic(0-63) | IP(46-1500) | AAL5(8-55) |
|---|---|---|---|
| AAAA03-0080C2-0007(8) | 0000(2) | MAC(14/22) | |
| AAAA03-000000-0800(8) | None(0) | | |

RFC1483 ETHERNET
RFC1483 IP, MPOA NO TAG,
MPLS CONTROL CHANNEL

Mode 2 = LANE V1

| LECID(2) | Generic(0-63) | IP(46-1500) | AAL5(8-55) |
|---|---|---|---|
| LECID(2) | MAC(14/22) | | |
| 0000(2) | MAC(14/22) | | |

LANE V1
RFC1483 VC MUXED ENET

Mode 3 = LANE V2

| LLC/SNAP(8) | ELANID(4) | LECID(2) | Generic(0-63) | IP(46-1500) | AAL5(8-55) |
|---|---|---|---|---|---|
| AAAA03-00A03E-000C(8) | | | | MAC(14/22) | |

LANE V2

Mode 5 = MPOA WITH TAG

| LLC/SNAP(8) | Tag(4) | Generic(0-63) | IP(46-1500) | AAL5(8-55) |
|---|---|---|---|---|
| AAAA03-000000-0800(8) | | None(0) | | |

MPOA WITH TAG

FIG. 3.

| OFFSET | GENERIC HEADER SIZE | FIELDS |
|---|---|---|
| 0 | 40 | RxVCTag(16), LECID(2), MAC(22) |
| 16 | 24 | LECID(2), MAC(22) |
| 18 | 22 | MAC(22) |
| 32 | 8 | LLC/SNAP(8) PORTION OF THE MAC HEADER |
| 40 | 0 | NONE |

MULTI-PROTOCOL CONVERSION ASSISTANCE METHOD AND SYSTEM FOR A NETWORK ACCELERATOR

CROSS-REFERENCES TO RELATED APPLICATIONS

This application claims priority from U.S. Provisional Patent Application No. 60/090,939, entitled "NETWORK ACCELERATOR SUBSYSTEM BASED ON SINGLE-CHIP NETWORK PROCESSOR AND INTERFACE PROTOCOL," filed Jun. 27, 1998, the entire disclosure of which is herein incorporated by reference for all purposes. This application also claims priority from U.S. patent application Ser. No. 09/271,061, entitled "TWO-DIMENSIONAL QUEUING/DE-QUEUING METHODS AND SYSTEMS FOR IMPLEMENTING THE SAME," filed Mar. 16, 1999, the entire disclosure of which is herein incorporated by reference for all purposes.

The following patent applications, including this one, are being filed concurrently, and the disclosure of each other application is hereby incorporated by reference in its entirety into this application for all purposes:

U.S. patent application Ser. No. 09/344,640, entitled "METHOD AND APPARATUS FOR CONTROLLING A NETWORK PROCESSOR," filed Jun. 25, 1999;

U.S. patent application Ser. No. 09/344,608, entitled "SYSTEM AND METHOD FOR PERFORMING CUT-THROUGH FORWARDING IN AN ATM NETWORK SUPPORTING LAN EMULATION," filed Jun. 25, 1999;

U.S. patent application Ser. No. 09/337,025, entitled "APPLICATION PROGRAMMING INTERFACES AND METHODS ENABLING A HOST TO INTERFACE WITH A NETWORK PROCESSOR," filed Jun. 25, 1999;

U.S. Pat. No. 6,501,731, entitled "CBR/VBR TRAFFIC SCHEDULER," filed Jun. 25, 1999;

U.S. patent application Ser. No. 09/344,672, entitled "MULTI-PROTOCOL CONVERSION ASSISTANCE METHOD AND SYSTEM FOR A NETWORK ACCELERATOR," filed Jun. 25, 1999;

U.S. Pat. No. 6,425,067, entitled "SYSTEMS AND METHODS FOR IMPLEMENTING POINTER MANAGEMENT," filed Jun. 25, 1999;

U.S. patent application Ser. No. 09/340,068, entitled "SYSTEM FOR MULTI-LAYER BROADBAND PROVISIONING IN COMPUTER NETWORKS," filed Jun. 25, 1999; and U.S. patent application Ser. No. 09/344,453, entitled "NETWORK ACCELERATOR SUBSYSTEM BASED ON SINGLE-CHIP NETWORK PROCESSOR AND INTERFACE PROTOCOL," filed Jun. 25, 1999.

Additionally, the disclosure of each of the following pending patent applications is hereby incorporated by reference in its entirety into this application for all purposes:

U.S. patent application Ser. No. 09/335,223, entitled "SYSTEMS AND METHODS FOR IMPLEMENTING ABR WITH GUARANTEED MCR," filed Jun. 17, 1999; and U.S. Pat. No. 6,311,212, entitled "SYSTEMS AND METHODS FOR ON-CHIP STORAGE OF VIRTUAL CONNECTION DESCRIPTORS," filed Mar. 16, 1999.

BACKGROUND OF THE INVENTION

The present invention relates in general to protocol conversion and tagging in networking systems and more particularly to techniques for converting multiple protocol types in a network accelerator to accommodate high bandwidth demand in an Asynchronous Transfer Mode (ATM) networking system.

The need for faster communication among computers and other systems requires ever faster and more efficient networks. Today, networks typically use an amalgam of various software and hardware to implement a variety of network functions and standards. Network devices such as client computer systems, servers, hubs, routers, switches, network backbones, etc., are each complex devices that require digital processing in hardware and software to facilitate network communication. Some tasks performed in a network device include translation between different network standards such as Ethernet and ATM, reformatting data, traffic scheduling, routing data cells, packets messages, etc. Depending on the particular protocol being implemented, some tasks may be performed at different points in the network.

In conventional networking systems that implement ATM, data traffic is handled by a Virtual Channel, or Virtual Connection (VC). There are typically many VCs in each system and each VC has its own characteristics, such as packet type, packet size and protocols. For each VC, a descriptor which identifies the particular VC and its characteristics and requirements is stored in a memory. When a scheduler determines that a particular VC is ready for transmission, the VC descriptor is accessed and processed to determine the appropriate characteristics and requirements for cell transmission on the particular connection.

In a typical network system, many different packets formatted according to different protocols are transported across the many various networking system devices using many VCs. When a packet is received over the network by a networking device, it is desirable to store the packet in a buffer for further processing of the information in the packet. For example, it is desirable to read information in a packet header and to add information to a packet header. Depending on the protocol used, the packet header size will vary accordingly. Adding information to a packet header is generally a slow process, limited by the time it takes to rebuild the packet and store it in a new buffer. Such rebuilding is usually done by software resident on a host CPU and can take many clock cycles to complete. It is therefore desirable to provide a networking device with the capability of adding information to a packet header without rebuilding the packet. It is also desirable to provide a generic packet header for all protocol types to improve processing efficiency.

SUMMARY OF THE INVENTION

The present invention provides novel techniques for accommodating multiple protocol encapsulation formats in a networking system. In particular, the techniques of the present invention provide systems and methods for adding information to a packet header without rebuilding and storing the packet in a second buffer location so as to assist in converting multiple protocol types.

According to the invention, systems and methods for assisting multiple protocol conversion in a network accelerator are provided. According to the invention, a network device includes a transmit processing engine, a receive processing engine and one or more memories, each memory including one or more buffers for storing packets. When packets are received, the receive engine is able to add a 4, 8, 12 or 16-byte tag to the front of each packet on a per-VC basis and store the packets buffers. Additionally, the receive engine is able to add an offset to the starting address of each packet in the buffer to which it is stored relative to the beginning of that buffer. When a packet is to be transmitted, the transmit engine is able to transmit the packet from an address that is offset from the starting address of the packet buffer by one or more bytes. Additionally, the transmit engine is able to add one of several predefined packet headers on a per-packet basis. In one embodiment, all components of the network device are implemented on a single semiconductor chip.

According to an aspect of the invention, a networking system device coupled to one or more networks is provided. The device typically comprises a memory including one or more buffers, each buffer for storing a packet, and a receive processing engine coupled to the memory. When a packet for a first one of a plurality of virtual channels (VCs) is received, the receive engine adds a per-VC tag to the beginning of the packet, wherein the tag is associated with the first VC, and wherein the receive engine stores the packet to a first one of the buffers.

According to another aspect of the invention, a networking system device coupled to one or more networks is provided. The device typically comprises a memory including one or more buffers, wherein a first packet for a first one of a plurality of VCs is stored in a first one of the buffers, and wherein the first packet is stored in the first buffer. The device also typically includes a transmit processing engine coupled to the memory, wherein when the first packet is ready to be transmitted, the transmit engine starts transmission of the first packet beginning at an offset address relative to the beginning of the first buffer.

According to yet another embodiment of the present invention, a networking system device coupled to one or more networks is provided. The device typically comprises a memory including one or more buffers, each buffer for storing a packet, and a receive processing engine coupled to the memory. When a first packet for a first one of a plurality of VCs is received, the receive engine adds a per-VC tag to the beginning of the packet, the tag being associated with the first VC, and wherein the receive engine stores the packet to a first one of the buffers. The device also typically includes a transmit processing engine coupled to the memory, wherein when the first packet is ready to be transmitted, the transmit engine starts transmission of the first packet beginning at a first offset address relative to the beginning of the first buffer.

According to an additional aspect of the invention, a method of processing a packet for transmission in a networking system device is provided, wherein the device is coupled to one or more networks, the device including a memory having one or more buffers, wherein the memory is coupled to a transmit processing engine and a receive processing engine. The method typically comprises the steps of receiving the packet on a first one of a plurality of virtual channels (VCs) by the receive engine, adding a tag to the beginning of the packet, the tag associated with the first VC, and storing the packet to a first one of the buffers. The method also typically includes the step of, when the first packet is ready to be transmitted, starting transmission of the packet beginning at a first offset address relative to the beginning of the first buffer by the transmit engine.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
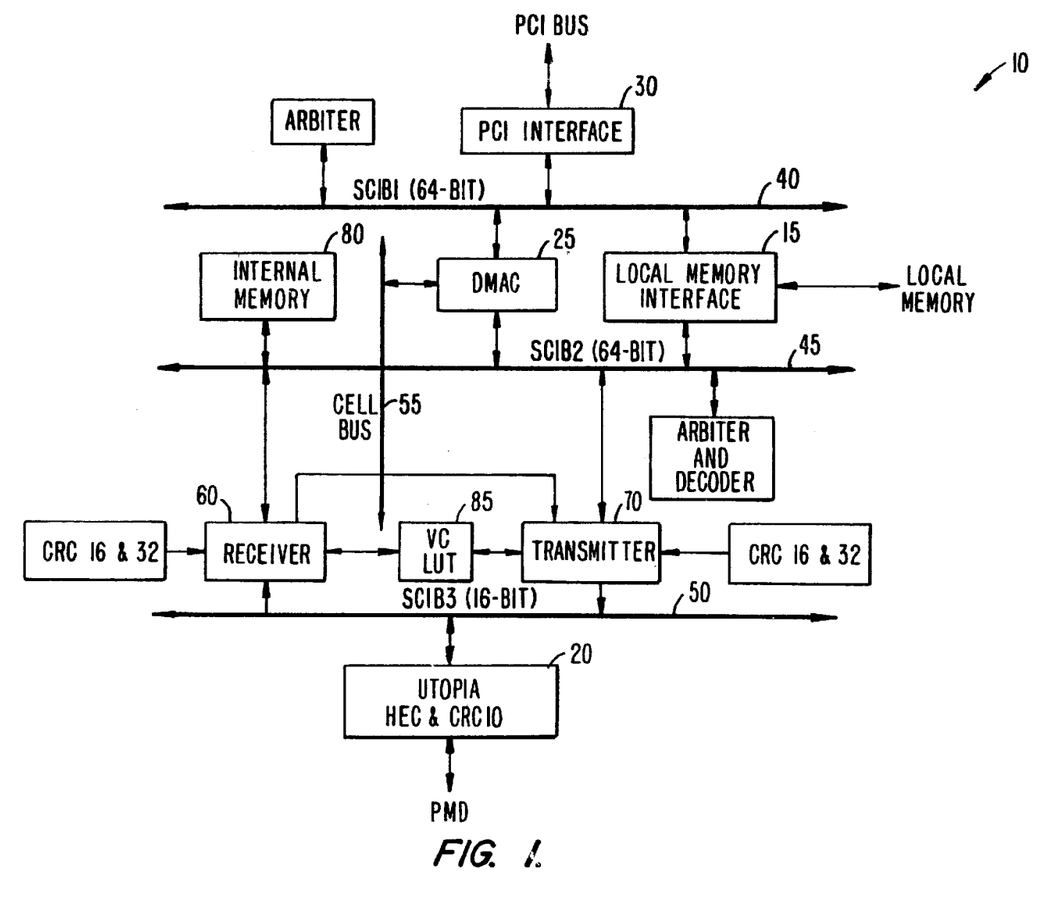
FIG. 1 is a block diagram of the architecture of a network processing engine according to the present invention.

FIG. 1 is a block diagram of the architecture of a network processing engine 10 according to the present invention. In preferred aspects, the network processing engine of the present invention is useful for a variety of network communications applications including implementation in multi-protocol network interface cards (NICs), server NICs, workgroup, IP and ATM switches, multi-protocol and IP routers, ATM backbone switch applications, multi-protocol and multi-protocol/ATM adapters and the like. In preferred aspects, all components of processing engine 10 reside on a single chip (e.g., a single silicon chip), but all components may be spread across many chips such that processing engine 10 is implemented using many chips.

Processing engine 10 includes a local memory interface block 15, UTOPIA interface 20, Direct Memory Access Controller (DMAC) 25, PCI interface 30, first internal bus 40, second internal bus 45, third internal bus 50, and cell bus 55. Processing engine 10 also includes an internal memory 80 and a receiver block 60 and a transmitter block 70 for processing incoming and outgoing data transmissions, respectively, over a communications interface, such as UTOPIA interface 20. Local memory interface block 15 provides a connection to a local, off-chip system memory, such as DRAM, SRAM, SDRAM, SSRAM or any combination thereof. DMAC 25 provides control of data transfers between external memories (PCI), internal memory 80 and the local memory. Internal memory 80 is used in one embodiment to store VC descriptors on-chip for fast access of the VC descriptors. Additionally, in one embodiment, internal memory 80 stores allowed cell rate (ACR) and minimum cell rate (MCR) bitmaps to provide enhanced ABR traffic scheduling capabilities.

PCI interface 30 provides a connection to external intelligence, such as a host computer system, and external packet memories. First and second internal buses 40 and 45 in one embodiment are non-multiplexed 32 bit address and 64 bit data buses. Depending on the desired line rate, PCI interface 30 is configured to run at frequencies up to 33 MHz over a 32 bit PCI bus, or at frequencies up to 66 MHz over a 64 bit PCI bus. For example, to achieve a 622 Mbps line rate, a 64 bit interface is used with frequencies up to 66 MHz. UTOPIA interface 20 supports connections to a broad range of layer 1 physical interfaces, including, for example, OC-1, OC-3, OC-12, OC-48, OC-192 and DS-3 interfaces and the like. To support a 622 Mbps line rate, the UTOPIA data bus is 16 bits, whereas for a 155 Mbps line rate the UTOPIA bus is 8 bits. Third internal data bus 50 is an 8 or 16 bit UTOPIA compatible interface. Cell bus 55 is a 64 bit data path and is used to transfer cells or frames between internal cell/frame buffers of receiver block 60 and transmitter block 70 and the PCI memory space through DMAC 25. Cell bus 55 allows several transactions to occur in parallel. For example, data payload transfers and descriptor data movement may occur simultaneously. Additionally, for a 622 Mbps line rate, cell bus 55 is capable of off-loading up to 160 MBps of bandwidth from local memory.

Figure 2:
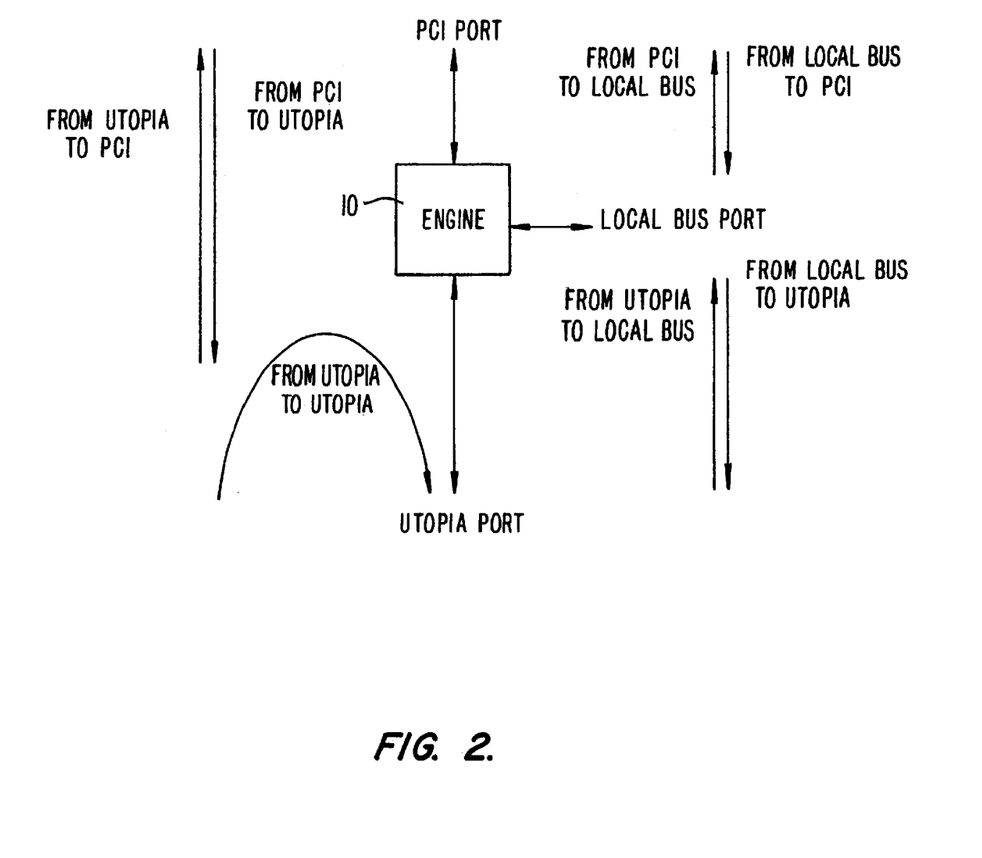
FIG. 2 illustrates examples of the data processing capabilities of network processing engine 10 according to the present invention.

FIG. 2 illustrates examples of the data processing capabilities of network processing engine 10. The exemplary data processing capabilities shown can be generally classified into four areas: receive data (from the UTOPIA port via UTOPIA interface 20), transmit data (to the UTOPIA port), DMA data transfer (between the PCI bus via PCI interface 30 and a local bus such as first internal bus 40), and UTOPIA loop-back (from the UTOPIA port back to the UTOPIA port). Referring to FIG. 2, engine 10 transparently transfers packets from the PCI bus to a local bus and vice versa via direct memory access (DMA). Additionally, engine 10 transfers receive UTOPIA data back to the transmit UTOPIA port on a per VC basis.

Incoming, or receive, data from UTOPIA port to either the local bus or the PCI bus is checked for the proper AAL or OAM protocol, and optionally policed for traffic shape conformance. For AAL5, the processing typically includes length and CRC-32 verification. For OAM cells, the CRC-10 is checked. Additionally, according to an embodiment of the invention, engine 10 has the ability to add a 4, 8, 12 or 16-byte tag to the front of each packet on a per-VC basis when storing the packet to a buffer as will be discussed in more detail below.

Engine 10 performs three major operations on the outgoing data (from the PCI or a local bus to the UTOPIA port) according to a preferred embodiment of the present invention. First, engine 10 provides for an offset starting address which allows packet transmission to begin from any one of multiple bytes of the packet buffer on a per-packet basis. In preferred aspects, the offset starting address indicates any of the first 63 bytes of the packet buffer. This offset option combined with an ability to place a packet starting anywhere within the first 63 bytes of the buffer implements a generic header capability. In preferred aspects, up to 63 bytes are added or removed from the front of the packet on a per-packet basis. Second, engine 10 optionally adds one of several predefined packet headers on a per-packet basis. Third, engine 10 adds the AAL and/or OAM overhead to the packet.

Figure 3:
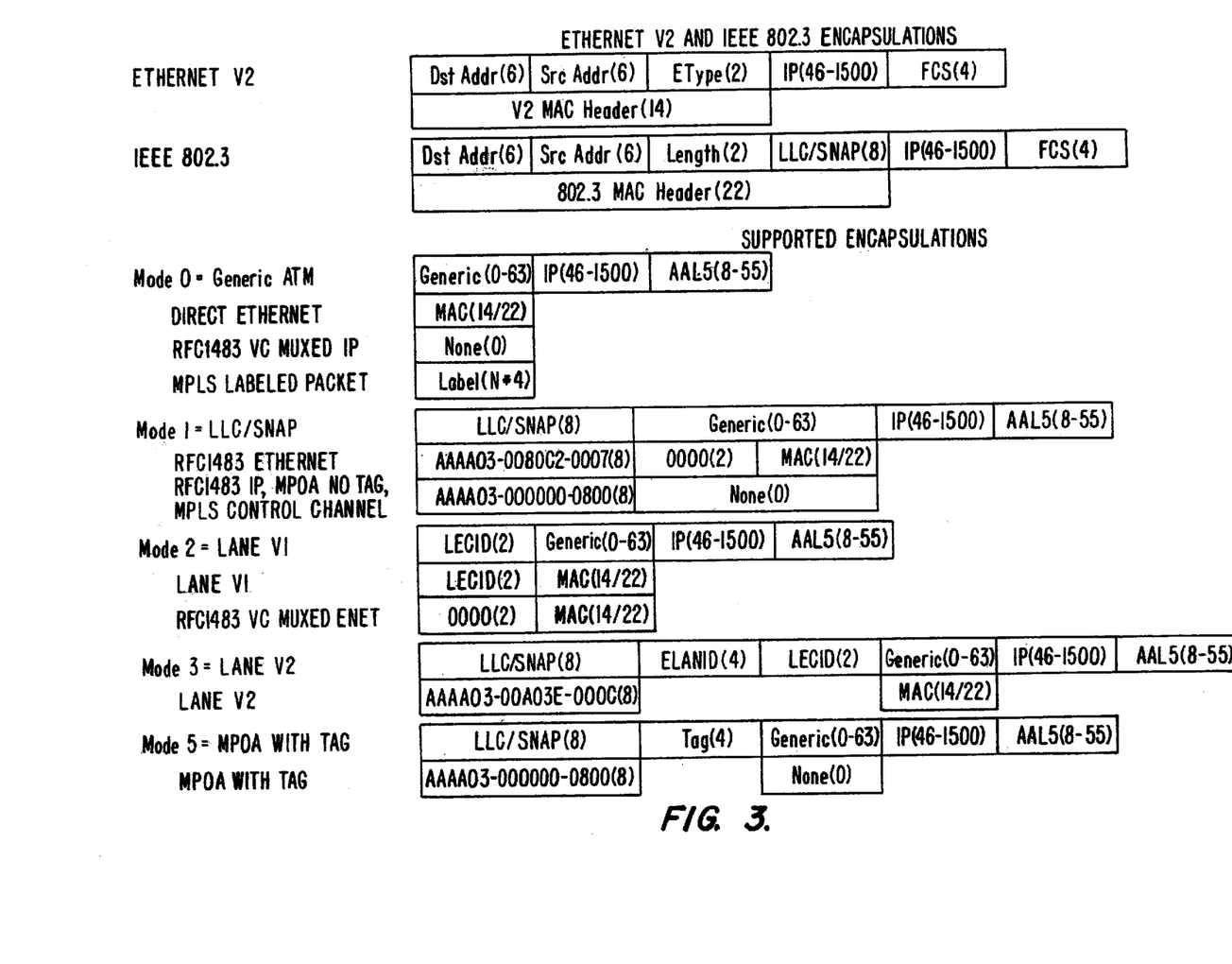
FIG. 3 illustrates examples of packet encapsulation formats supported by engine 10 according to the present invention.

According to one embodiment, engine 10 supports a wide range of packet encapsulations. An example of packet encapsulation formats supported by engine 10 are shown in FIG. 3. While the examples all show IP data as the payload, engine 10 supports any routing protocol suite since the payload content is transparent to engine 10.

The packet encapsulation techniques provided by engine 10 are used to process a wide variety of packet formats. According to one embodiment, engine 10 adds or removes a generic packet header on a per-packet basis, and adds several fixed packet headers on a per-packet basis. According to a preferred embodiment of the generic header processing capability, when a packet is received from the UTOPIA port, engine 10 adds a 4, 8, 12 or 16 byte per VC tag to the front of the packet when storing the packet to a buffer. In one embodiment, packets are stored in buffers in PCI memory space, but may also be stored in local memory or internal memory 80. According to one embodiment, there is also selection of an offset for storing the packet, including the added per-VC tag, at an offset starting address so as to allow flexibility in manipulating and adding information to the header. In preferred aspects, the packet is stored at an offset of 0, 16, 32, or 48 bytes in the buffer. When a packet is prepared for transmission to the UTOPIA port, e.g., in response to an Add_Packet command received by transmit engine 70 from external intelligence, the transmission is started from a buffer address based on an offset field in the Add_Packet command, which specifies the number of bytes from the beginning of the buffer that are not to be included as part of the packet. In preferred aspects, the offset field is a 6-bit field, which allows for up to a 63 byte offset. For example, a value of 0 indicates all the bytes from the beginning of the buffer are to be included, a value of 1 indicates the first byte is not to be included, a value of 2 indicates the first two bytes are not to be included, and so on.

Figure 4:
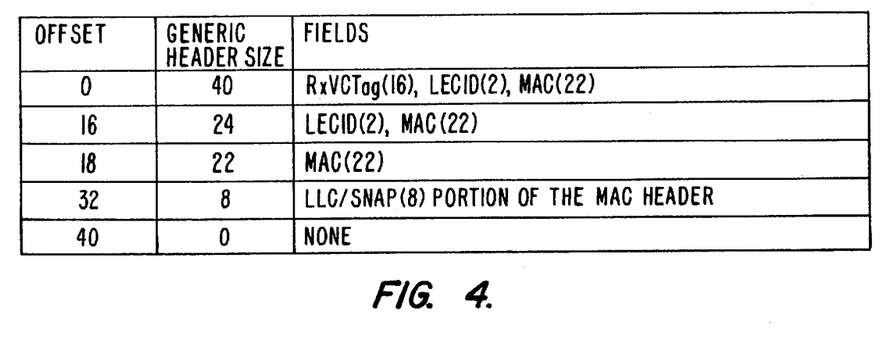
FIG. 4 summarizes examples of offset values and fields included in the generic header according to the present invention.

If, for example, a LANE V1 IEEE 802.3 (see FIG. 3 for the packet format) packet is received on a VC that is configured for an added 16-byte tag in front of the packet, then by setting the Add_Packet offset to various values, differing set of fields in the generic header are possible. A list of examples of possible offset values and fields included in the generic header for this example is shown in FIG. 4.

In addition to the generic format, in one embodiment, the Add_Packet command includes a mode field that allows additional encapsulations to be placed in front of the packet. Although all of the mode-specific formats could be accommodated under the generic header encapsulation, one reason for using the other modes is to reduce the packet processing overhead in both the external intelligence and engine 10. Examples of such encapsulations are shown in FIG. 3. As shown, mode 0 adds no additional packet encapsulations, mode 1 adds an 8-byte encapsulation usually used for LLC/SNAP headers, mode 2 adds a 2-byte encapsulation usually used for the LANE V1 LECID, mode 3 adds an 8-byte encapsulation usually used for LLC/SNAP headers, a 4-byte encapsulation usually used the LANE V2 ELANID, and a 2-byte encapsulation usually used for the LANE V2 LECID, and mode 5 adds an 8-byte encapsulation usually used for LLC/SNAP headers and a 4-byte encapsulation usually used for MPOA tags. All of these additional headers are specified directly in the Add-Packet command with the exception of the 8-byte LLC/SNAP encapsulation. To speed up processing of this header, engine 10 preferably maintains internal LLC/SNAP encapsulation values, but it may maintain fewer or more values. In one embodiment, instead of explicitly indicating these values through the Add-Packet command, the packet source specifies a pointer indicating which of the internal LLC/SNAP values needs to be used.

Figure 5:
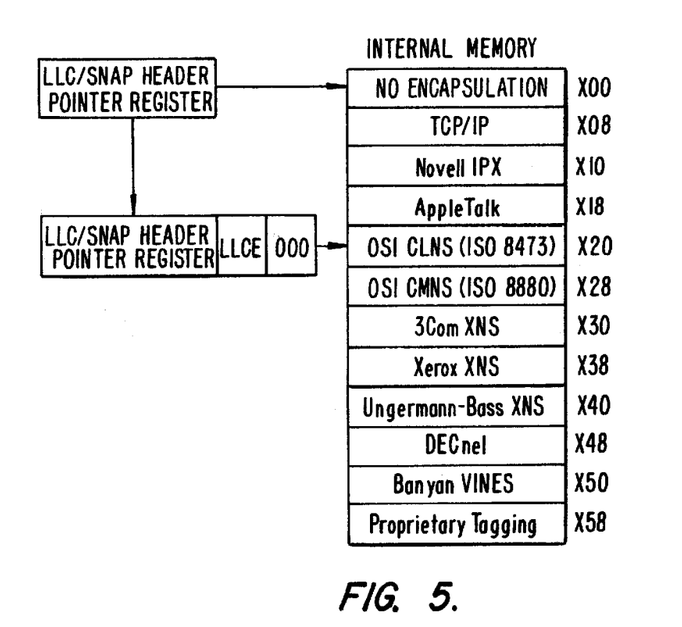
FIG. 5 illustrates an example of internal LLC/SNAP values used by engine 10 according to an embodiment of the present invention.

FIG. 5 illustrates an example of internal LLC/SNAP values used by engine 10 according to an embodiment of the present invention. In one embodiment, the LLCE (LLC Encapsulation) field is used as an index to a Protocol Header Table to attach the appropriate LLC/SNAP encapsulation. If the value of the LLCE field is 0, the packet is transmitted without LLC/SNAP encapsulation.

The first two formats shown in FIG. 3 describe two Ethernet formats in use today. In general, the main difference between Ethernet V2 and IEEE 802.3 are the Etype/Length and LLC/SNAP fields. If the Etype/Length field is greater than 1536 ($0600_h$) then the packet is an Ethernet V2 packet, otherwise the packet is an IEEE 802.3 packet. The IEEE 802.3 packet also has an LLC/SNAP field, which helps identify the payload type being carried.

The remaining formats shown in FIG. 3 include additional encapsulation modes and provide a detailed description of the LLC/SNAP (specified in hexadecimal) and generic headers for some of the more common IP over ATM formats. All bit values are specified in hexadecimal and the length of each field is included in parenthesis and is specified in decimal. As shown, mode 0, with the generic header containing the MAC header, is the direct mapping of Ethernet packets into an ATM payload. This mapping is not specified in any of the standards. Mode 0, with no generic header, is the mapping for VC-based multiplexing of routed protocols according to RFC1483. Mode 0 can also be used for MPLS by adding the multiple 4-byte labels to the front of a packet. Mode 1 is used for the RFC1483 bridged Ethernet packets without FCS, or MPOA without tags. Mode 2 is used for LANE V1 or RFC1483 VC muxed Ethernet. Mode 3 is used for LANE V2. Finally, mode 5 is used for MPOA with tags.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A device comprising:
   a memory including one or more buffers; and
   a receive processing engine coupled to the memory, wherein when a packet for a first one of a plurality of virtual channels (VCs) is received, the receive processing engine
   stores the packet in a first of the buffers at an offset address relative to a beginning of the first buffer, and
   adds a per-VC tag to the packet, said tag associated with the first VC, and wherein the receive processing engine stores the per-VC tag in the first buffer between the beginning and the offset address.

2. The device of claim 1, wherein the tag is one of a 4, 8, 12 and 16 byte tag.

3. The device of claim 1, wherein the offset address is one of 16, 32 and 48 bytes relative to the beginning of the first buffer.

4. The device of claim 1, wherein an external processor instructs the receive processing engine to store the packet to the first buffer at the offset address.

5. A device comprising:
   a memory including one or more buffers, wherein a packet for a first one of a plurality of virtual channels (VCs) is stored in a first one of the buffers, and wherein the packet is stored in the first buffer at a first offset address relative to a beginning of the first buffer and includes a per-VC tag associated with the first virtual channel, the per-VC tag stored in the first buffer between the beginning and the first offset address; and
   a transmit processing engine coupled to the memory, wherein when the packet is ready to be transmitted, the transmit engine starts transmission of the packet beginning at a second offset address relative to the beginning of the first buffer.

6. The device of claim 5, wherein the transmit processing engine receives an add packet command indicating that the packet is ready for transmission, wherein the add packet command includes an offset field that indicates where the second offset address begins relative to the beginning of the first buffer.

7. The device of claim 6, wherein the offset field is a 6-bit field.

8. The device of claim 6, wherein the add packet command further includes a mode field for specifying a packet encapsulation to be added to the beginning of the packet, wherein transmit processing engine adds the packet encapsulation specified prior to transmission.

9. The device of claim 8, wherein the mode field specifies that no encapsulation is to be added.

10. The device of claim 8, wherein the packet encapsulation specified by the mode field includes an LLC/SNAP header.

11. The device of claim 10, wherein the mode field further specifies adding one of a LANE header and an MPOA tag.

12. The device of claim 10 further including an LLC/SNAP encapsulation table identifying a plurality of LLC/SNAP encapsulation values, wherein the add packet command further includes a LLCE field which points to a specific one of the LLC/SNAP encapsulation values, wherein the specific value is added to the packet.

13. A device comprising:
   a memory including one or more buffers;
   a receive processing engine coupled to the memory, wherein when a packet for a first one of a plurality of virtual channels (VCs) is received, the receive processing engine
   stores the packet in a first of the buffers at a first offset address relative to the beginning of the first buffer, and
   adds a per-VC tag to the packet, said tag associated with the first VC, and wherein the receive processing engine stores the per-VC tag in the first buffer between the beginning and the first offset address; and
   a transmit processing engine coupled to the memory, wherein when the packet is ready to be transmitted, the transmit processing engine starts transmission of the packet beginning at a second offset address relative to the beginning of the first buffer.

14. The device of claim 13, wherein the first offset address and the second offset address are equivalent.

15. The device of claim 13, wherein the first offset address is one of 16, 32 and 48 bytes relative to the beginning of the first buffer.

16. The device of claim 13, wherein the transmit processing engine receives an add packet command indicating that the first packet is ready for transmission, wherein the add packet command includes an offset field that indicates where the second offset address begins relative to the beginning of the first buffer.

17. The device of claim 16, wherein the offset field is a 6-bit field.

18. The device of claim 16, wherein the add packet command further includes a mode field for specifying a packet encapsulation to be added to the beginning of the packet, wherein transmit processing engine adds the packet encapsulation specified prior to transmission.

19. The device of claim 13, wherein the tag is one of a 4, 8, 12 and 16 byte tag.

20. The device of claim 13, wherein the memory, receive processing engine and transmit processing engine are implemented together on a single chip.

21. A method comprising:

receiving a packet on a first one of a plurality of virtual channels (VCs);

adding a per-VC tag to the packet, the per-VC tag associated with the first VC;

storing the packet to a first of a number of buffers at a first offset address relative to a beginning of the first buffer;

storing the per-VC tag in the first buffer between the beginning and the first offset address; and when the packet is ready to be transmitted, starting transmission of the packet beginning at a second offset address relative to the beginning of the first buffer.

22. The method of claim 21, wherein the first offset address and the second offset address are equivalent.

23. The method of claim 21, wherein the first offset address is one of 16, 32 and 48 bytes relative to the beginning of the first buffer.

24. The method of claim 21, further comprising receiving an add packet command indicating that the packet is ready for transmission, wherein the add packet command includes an offset field that indicates where the second offset address begins relative to the beginning of the first buffer.

25. The method of claim 24, wherein the offset field is a 6-bit field.

26. The method of claim 24, wherein the add packet command further includes a mode field for specifying a packet encapsulation to be added to the beginning of the packet, the method further comprising adding the specified packet encapsulation to the packet prior to transmission.

27. The method of claim 21, wherein the tag is one of a 4, 8, 12 and 16 byte tag.

28. The device of claim 5, wherein the first offset address and the second offset address are equivalent.

* * * * *